United States Patent

Buckman et al.

[15] 3,639,209
[45] Feb. 1, 1972

[54] A PROCESS OF MAKING PAPER USING CATIONIC STARCH COMPLEXES

[72] Inventors: Stanley J. Buckman; Richard W. Lutey; George M. Jennings, all of Memphis, Tenn.

[73] Assignee: Buckman Laboratories, Inc., Memphis, Tenn.

[22] Filed: Apr. 7, 1970

[21] Appl. No.: 26,434

[52] U.S. Cl. .................................162/175, 127/32, 127/71, 260/233.3 R
[51] Int. Cl. ...........................................D21h 3/28
[58] Field of Search ....................162/175; 127/32, 33, 71; 260/233.3, 233.5

[56] References Cited

UNITED STATES PATENTS

| | | | |
|---|---|---|---|
| 3,284,442 | 11/1966 | Jarowenko et al. | 260/233.5 |
| 3,313,784 | 4/1967 | Vrancken et al. | 260/233.3 X |
| 3,336,292 | 8/1967 | Kirby | 162/175 X |
| 3,346,563 | 10/1967 | Shildneck et al. | 162/175 X |
| 3,417,078 | 12/1968 | Patel et al. | 162/175 X |

Primary Examiner—Reuben Friedman
Assistant Examiner—Frederick Frei
Attorney—Floyd Trimble

[57] ABSTRACT

Cationic starch complexes prepared by reacting an aqueous starch slurry with a water-soluble cationic polymeric polyelectrolyte are useful in treating cellulosic materials and as flocculating agents in aqueous systems.

12 Claims, No Drawings

PROCESS OF MAKING PAPER USING CATIONIC STARCH COMPLEXES

This invention relates to the art of cationic starch complexes and, more particularly, to cationic starch complexes which are obtained by reacting starch with a water-soluble cationic polymeric polyelectrolyte.

Cationic starches, a class of specialty products of recent origin, have within a short period of time become very important commercially, particularly for use in the manufacture of paper. In papermaking, these derivatives function very efficiently as internal binders, retention aids for mineral fillers, and emulsifying agents for water-repellent sizes. Although cationic starches are three to four times as effective as conventional unmodified starches in improving paper strength, the present utilization of these derivatives represents only a small fraction of the total amount of starch used in the manufacture of paper. This curtailed use has been due almost entirely to the premium price at which these products must be sold as a result of high production costs.

Prior to our invention, cationic starch complexes have been prepared by an etherification process involving the introduction of basic nitrogen groups into the starch molecule. In general, suitable products of this type have been limited to two classifications, one of which is identified as a tertiary aminoalkyl starch ether and the other as a quaternary ammonium alkyl starch ether. The tertiary derivative is prepared by reacting an alkaline starch slurry with 2-dimethylaminoethyl chloride followed by acidification, while the quaternary derivative is prepared by reacting such a starch slurry with N-(2,3-epoxypropyl)-trimethylammonium chloride, also followed by acidification. The production of cationic starches through an etherification reaction not only requires the use of relatively expensive reagents but the efficiency of the process is severely limited because of the necessity of forming a product which can be dewatered easily as, for example, by filtration.

In addition to their use in the paper industry, the cationic starch complexes of the present invention are effective as drainage aids, formation aids, and retention aids in a wide variety of applications such as spinning aids and antistatic agents for textile fibers and plastics. Furthermore, these complexes, particularly those prepared from cationic polymeric polyelectrolytes having a relatively high molecular weight, are also useful as flocculants in the clarification of incoming water supplies and industrial and municipal effluents. We have found that when the compositions of our invention are used as flocculants, low-density flocs containing a large quantity of finely divided particles are formed. Although the rate of flocculation is slow in forming such flocs, the overall result in papermaking and many other applications is desirable because under such conditions the loss of valuable solids is reduced to a minimum. The retention aid and flocculating properties of these polymers are very important in view of the attention now being given to stream pollution, as will be obvious from the following discussion.

Many methods have been proposed to alleviate the problems caused by stream pollution; none, however, have been entirely satisfactory. Obviously, complete retention of all particulate matter in the finished product would eliminate all problems now caused by the discharge of industrial wastes into public waters. Complete retention, however, cannot be attained, so the best practical method is the retention as completely as possible of all particulate matter in the finished product, thus reducing the amount of said particulate matter in the water that is being discharged.

Reuse of process water is the next best method used by industry to reduce the pollution problem, but this procedure is only partially successful because continued reuse of process water increases the concentration of the particulate matter as well as dissolved solids in the water to such an extent that the water is no longer suitable for industrial use. When this condition is reached, the process water must be either discharged as waste or the materials contained therein recovered and utilized or discarded. Since discarding the water as waste is impractical and not permitted by most public authorities, it follows that the removal of the materials contained in the water is mandatory. In the pulp and paper industry, the materials remaining in the process water are valuable products and if not recovered, represent an economic loss. The cationic starch complexes of our invention are particularly useful in recovering these valuable products and thereby alleviate pollution problems of the pulp and papermaking industry.

The compounds of our invention can also be used to remove any solid particulate matter remaining in the water before it is discharged, even though such matter is not of a character suitable for use but must be disposed of by microbiological decomposition, combustion, or buried in a sanitary fill.

The cationic starch complexes of this invention also are useful in the treatment of incoming water in addition to the aforementioned applications in industrial systems such as pulp and paper mills. Precipitation of the solids followed by filtration or settling has been used to the greatest extent by industry for the treatment of incoming water. Various flocculating agents have been proposed for this purpose including the well-known product alum. While alum is available economically in adequate quantities, it is relatively slow acting and is not an efficient flocculant for the finely divided solids that are generally present in industrial and municipal water supplies. In contrast, the cationic starch complexes of this invention are fast acting flocculants. Since these complexes are compatible with alum, they can be used as a supplement to low cost alum, thus achieving a reduction in process time plus the desired degree of completeness in the removal of finely divided solids from incoming water. Similar principles apply to the removal of particulate solid matter from water being discharged as industrial or municipal effluents.

In addition to the use of the cationic starch complexes as summarized above, these compositions are useful in applications such as bacteriostatic agents, accelerators for curing various plastics, liquid-solid separation in gas scrubber water from steel blast furnaces, and the separation of tailings and fines from minerals in ore processing.

It is, therefore, a principal object of the present invention to provide a new process for the production of cationic starch complexes which obviates the disadvantages of the prior art processes for the production of these products.

It is another object of our invention to provide cationic starch complexes that are useful in pulp and paper manufacturing as drainage aids, formation aids, retention aids, strength aids, and flocculants.

It is yet another object of this invention to provide new cationic starch complexes for use in water treatment, capable of flocculating undesirable ions and particulate matter so that said ions and particulate matter may be removed from water supplies or rendered unobnoxious prior to initial use or reuse of the water.

These and other objects and advantages of the invention will appear as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

In brief, the foregoing objects and advantages are attained by use of a cationic starch complex prepared, preferably shortly before its subsequent use, by reacting an aqueous starch slurry with a water-soluble cationic polymeric polyelectrolyte in an amount varying from 2 to 25 weight percent, preferably 5 to 10 weight percent of the polyelectrolyte based on the dry weight of the starch. The polyelectrolyte is prepared by reacting a dihalo organic compound with a secondary or ditertiary amine. Suitable dihalo organic compounds are those having the formula:

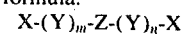

wherein X represents Br or Cl; Y represents a CH₂ group and/or a substituted CH₂ group wherein one of the hydrogens thereof is replaced by alkyl or hydroxylmethyl; and *m* and *n* independently represent integers varying from 1 to 10.

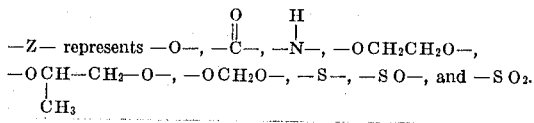

When Y represents a substituted CH₂ group or represents both unsubstituted and substituted CH₂ groups, the total number of substituted CH₂ groups may not exceed 3.

Also stated briefly, when the cationic starch complexes of our invention are used as a papermaking aid, one or more are added continuously to the paper machine system at suitable locations such as the machine chest, the fan pump, or the headbox. Furthermore, we have found that the starch complexes of this invention may be added to the papermaking system producing various types of paper and paperboard with highly beneficial results. Broadly stated, the desirable results obtained by following the teachings of this invention may be summarized as follows:

1. Increased production per unit of equipment
2. Improved formation and strength properties of paper and paperboard
3. Increase in overall mill efficiency in that losses of fines such as fine fibers, pigments, fillers, and other paper components are minimized by increasing retention of these products in paper and paperboard.
4. Alleviation of water pollution problems When these products are used as flocculants, one or more may be added to a given aqueous suspension with sufficient agitation to insure uniform Following this treatment, the flocculated aggregates will settle.

The amount of the products of this invention necessary to produce the desired result is highly variable depending on the amount and nature of the particulate matter on which an effect is needed as well as the other components of the ionic environment in which the starch complex and particulate matter are present. Suitable and preferred quantities of the products of this invention when used in papermaking processes vary from 0.05 to 5.0 weight percent and 0.5 to 2.0 weight percent, respectively, based on the dry weight of the papermaking components. When used in water treatment processes, suitable and preferred quantities of the products of this invention vary from 0.5 to 25 parts and 0.5 to 5.0 parts, respectively, per million parts of water and particulate matter.

Before proceeding with specific examples illustrating our invention, it may be well to indicate in general the nature of the material required. Suitable starches for use in this invention include any of the convention starches available commercially such as those derived from corn, wheat, potato, tapioca, waxy maize, sago, rice, sorghum, arrowroot, and high amylose corn as well as the amylose and amylopectin fractions of any of the latter starch sources.

Since the reaction between the dihalo compound and the amine is equimolecular, we generally prefer to employ these two reactants in approximately equal molecular proportions in preparing the cationic polymeric polyelectrolytes used in our invention.

Examples of suitable dihalo organic compounds which have been used in the preparation of the polymeric compounds include: Bis(chloromethyl) ether, bis-(2-chloroethyl) ether, bis(2-chloropropyl) ether, bis(4-chlorobutyl) ether, oxy-3,3-bis(2-chloropropanol-1), bis(2-chloroethyl) sulfide, bis(2-chloroethyl) sulfoxide, bis(2-chloroethyl) sulfone, bis(3-chloropropyl) sulfide, bis(2-chloropropyl) sulfone, bis(2-chloroethoxy)ethane, 1,2-bis(chloromethoxy)-ethane, 1,2-bis(2-chloroethoxy)ethane, 1,2-bis(2-chloroethoxy)propane, 1,2-bis-(2-chloropropoxy)propane, 1,3-dichloropropanone-2, 1,3-dichloropropanol-2, bis-(2-chloromethyl)amine, 1,4-bis(chloromethyl)benzene, 1,5-bis(chloromethyl)-naphthalene, 9,10-bis(chloromethyl)anthracene, chloroethyl chloromethyl ether, 1-(4-chlorobutyl)chloromethyl ether, chloroethyl chloromethyl sulfide, chloroethyl chloromethyl sulfoxide, and chloroethyl chloromethyl sulfone.

In addition to using the foregoing dichloro compounds, the corresponding dibromo compounds were also used in preparing the polymeric compounds.

Examples of suitable secondary and ditertiary amines which have been used in the preparation of the polymeric compounds include: N,N,N',N'-tetramethyl-ethylenediamine, N,N,N',N'-tetraethylethylenediamine, N,N,N',N'-tetramethyl-1,3-butanediamine, N,N,N',N'-tetraethyl-1,3-butanediamine, N,N,N',N'-tetra-methyl-1,4-butanediamine, N,N,N',n'-tetraethyl-1,4-butanediamine, N,N'-di-methylpiperazine, N,N'-diethylpiperazine, 1,4-diazabicyclo(2,2,2)octane, 4,4'-bipyridyl, N,N,N',N'-tetramethylbenzidine, N,N,N',N'-tetraethylbenzidine, oxy-bis-2,2(N,N-dimethylethylamine), 4,4'-bis(dimethylamino)benzophenone, p,p'-methylenebis(N,N'-dimethylaniline), dimethylamine, diethylamine, di-isopropyl amine, dibutylamine, piperidine, morpholine, 2,6-dimethylmorpholine, 1,2,4-trimethyl-piperazine, and 1,4-bis(2-hydroxypropyl)-2-methylpiperazine.

In general the ditertiary amines are preferred as the dihalo organic compounds react directly with such amines to form a polyquaternary product. If a secondary amine is used, the dihalo compound reacts with the amine to form a ditertiary amine salt which upon neutralization undergoes polymerization with an additional quantity of the dihalo compound. The reaction between the dihalo compound and the amine is conducted in the presence of an inert solvent, preferably water. A suitable reaction temperature varies from 50°–150° C.

In order to disclose the nature of the present invention still more clearly, the following illustrative examples will be given wherein "parts" are parts by weight. It is to be understood, however, that the invention is not to be limited to the specific conditions or details set forth in these examples except insofar as such limitations are specified in the appended claims.

EXAMPLE 1

A 300-gallon stainless steel reactor fitted with a stirrer was charged with 317 parts of N,N,N',N'-tetramethylethylenediamine, 392 parts of dichloroethyl ether, and 381 parts of water. The contents were stirred and hot water was introduced into the jacket. The temperature was maintained at 93°–102° C. for a period of 16 hours. At the end of this period, the resulting polymer solution (polymer plus water) was cooled and removed from the reactor. The polymer had a reduced viscosity of 0.3, wherein reduced viscosity is defined as the specific viscosity divided by the concentration in grams per 100 milliliters. In all examples, a concentration of 0.2 gram of polymer per 100 milliliters of water was used to determine the reduced viscosity.

EXAMPLE 2

A 250-milliliter three-necked, round-bottom flask equipped with stirrer, addition funnel, and thermometer was charged with 50.0 grams (0.432 mole) of N,N,N',N'-tetramethylethylenediamine, 61.8 grams (0.432 mole) of dichloroethyl ether, and 60 grams of water. The reactants were stirred and heated at 100° C. for 18 hours. At the end of this period, the resulting polymer solution was cooled and removed from the flask. The polymer had a reduced viscosity of 0.3.

EXAMPLE 3

The procedure of example 2 was followed with the exception that 80.7 grams (0.432 mole) of 1,2-bis(2-chloroethoxy)ethane was substituted for the dichloroethyl ether. The amount of water used in this example was 70.3 grams. At the end of the reaction period, the polymer solution was viscous and lightcolored. The polymer had a reduced viscosity of 0.3.

EXAMPLE 4

The procedure of example 2 was again followed wherein 35.0 grams (0.306 mole) of N,N'-dimethylpiperazine was substituted for the amine used in example 2 and 43.4 grams (0.306 mole) of dichloroethyl ether was the specific dihalo compound used together with 41.9 grams of water. The polymer so obtained was dark red having a reduced viscosity of 0.15.

EXAMPLE 5

The procedure of example 2 was again followed wherein 35 grams (0.20 mole) of 1,4-bis(chloromethyl)benzene, 23.2 grams (0.20 mole) of N,N,N',N'-tetramethylethylenediamine, and 41.3 grams of water were used. The polymer solution was a light-colored viscous liquid. The polymer had a reduced viscosity of 1.7.

EXAMPLE 6

The procedure of example 2 was again followed in which 62.5 grams (0.432 mole) of N,N,N',N'-tetramethyl-1,3-butanediamine and 61.8 grams (0.432 mole) of dichloroethyl ether in 61.2 grams of water were reacted at 100° C. for 18 hours. The polymer solution so obtained was light colored but very viscous. The polymer had a reduced viscosity of 0.4.

EXAMPLE 7

The procedure of example 2 was again followed in which 11 grams (0.0629 mole) of 1,4-bis(chloromethyl)benzene, 4.35 grams (0.629 mole) of an aqueous 60-percent dimethylamide solution, and 2.52 grams (0.063 mole) of sodium hydroxide mixed with 6.73 grams of water were reacted for 18 hours at 100° C. The polymer mixture so obtained was a solid. The polymer had a reduced viscosity of 0.40.

EXAMPLE 8

In this example, 18.7 grams (0.100 mole) of 1,2-bis(2-chloroethoxy)ethane, 7.5 grams (0.100 mole) of an aqueous 60-percent solution of dimethylamine, 4.0 grams (0.100 mole) of sodium hydroxide, and 5.5 grams of water were sealed in a Carius tube. The contents of the tube were thoroughly mixed by shaking and heated to 100° C. for 16 hours. The final polymer mixture was a light-colored liquid containing salt crystals. The polymer had a reduced viscosity of 0.15.

EXAMPLE 9

The procedure of example 2 was again followed in which 50 grams (0.229 mole) of 1,3-dibromo-2-propanol, 26.6 grams (0.229 mole) of the amine used in example 3, and 76.6 grams of water were reacted for 18 hours at 100° C. The polymer had a reduced viscosity of less than 0.1.

All of the polymers prepared according to examples 4 to 10 as well as those prepared from the foregoing lists of dihalo organic compounds and amines were found to be effective flocculants.

EXAMPLE 10

Preparation of a cationic starch complex

A reactor equipped with a stirrer, thermometer, and means for heating was charged with 67.55 parts of water, 30 parts of pearl starch, and 3.00 parts of the polymeric polyelectrolyte of example 1 dissolved in 2.45 parts of water. The reactants were stirred and heated at 195° F. for 15 minutes. At the end of this period, the resulting product was diluted with sufficient water to reduce the concentration of starch solids to 3 percent.

EXAMPLE 11

In this example, two runs were made:

Run No. 1 was a conventional process for the production of newsprint on a fourdrinier machine from an aqueous slurry of cellulosic materials containing the usual papermaking additives. To improve the linting characteristics of the paper, a commercial cationic starch was added to the furnish at the fan pump at a rate equal to 7 pounds of starch per ton of paper produced.

Since the art of papermaking is well known by those skilled in this field, a description of such a process will not be repeated here. For a detailed description thereof, reference is made to any standard text on the subject. Two such references are Sven A. Rydholm, "Pulping Processes," Interscience Publishers, New York, London, and Sydney, 1965, particularly pages 1135-1166, and "Pulp and Paper Science and Technology, Vol. II Paper," edited by C. Earl Libby, McGraw-Hill Book Co., New York, 1962, particularly chapter 7 thereof, which references are hereby made a part of this application.

Run No. 2 was a duplicate of run No. 1 with the exception that an equal quantity of treated corn starch was substituted for the cationic starch. In preparing the treated corn starch used in this run, the product of example 1 was added with stirring to an aqueous slurry of corn starch in an amount equivalent to 10 percent based on the dry weight of corn starch. After the two components were admixed, the mixture was heated to 190° F. and maintained at that temperature for 5 minutes. The treated corn starch was then added to the furnish at the fan pump.

Test results revealed that the linting characteristics of the two paper products so produced were equivalent. In addition, sheet strength and ash content of the paper from run No. 2 were both higher than that of the paper from run No. 1.

EXAMPLES 12–18

In these examples, the procedure of example 11 was repeated with the exception that the products of examples 3–9 were individually substituted for the product of example 1 in preparing the treated corn starch which was subsequently used in the papermaking process. The results were similar to those obtained in example 11.

Similar results were obtained when wheat, potato, tapioca, waxy maize, sago, rice, sorghum, and arrowroot starches were substituted for the corn starch used in examples 11–18.

EXAMPLE 19

In this example, two runs were made:

Run No. 1 was a conventional process for the production of linerboard on a fourdrinier machine from an aqueous slurry of cellulosic materials containing the usual papermaking additives. In this run, locust bean gun used in conjunction with the product of example 1 was added to the furnish at the fan pump to give paper of the desired strength. Specifically, 100 pounds of gum and 7.1 pounds of the product of example 1 diluted with 1,500 gallons of water were added to the system at a rate of 40 gallons per minute. This corresponds to about 3.5 pounds per ton of paper.

Run No. 2 was a duplicate of run No. 1 with the exception that 200 pounds of tapioca starch was substituted for the 100 pounds of gum and the quantity of the product of example 1 was reduced to 4.77 pounds from 7.1 pounds. As in run No. 1, the two components were diluted with 1,500 gallons of water and then added to the system. When the resulting mixture was added at a rate of 20 gallons per minute, the paper so produced had the same strength as that produced in run No. 1.

Similar results were obtained when the products of examples 3–9 were individually substituted for the product of example 1 as described in runs No. 1 and 2 above. We also found that corn, wheat, potato, waxy maize, sago, rice, sorghum, and arrowroot starches could be used instead of tapioca starch with equivalent results.

EXAMPLE 20

The flocculating ability of the cationic starch complex of example 10 was determined by use of a "jar test" in which an aqueous mixture containing 150 parts of air-dried paper fiber and 250 parts of a predispersed clay per million parts of water was treated with various amounts of alum and the cationic starch complex. In this example, the complex was diluted with water to make up a solution containing varying amounts of the complex, and then added with gentle stirring plus the alum to the suspension of clay and fiber. Comparable results were also obtained in similar systems containing suspensions of clay and fiber without alum. After mixing, the results were rated visually on the basis of the following key:

0 = no apparent flocculation

1 = some flocculation

2 = most of the turbidity removed

3 = complete flocculation, water essentially clear

| Alum[1] | Complex[1] | pH 5 | | | pH 9 | | |
|---|---|---|---|---|---|---|---|
| | | 1 min. | 5 min. | 30 min. | 1 min. | 5 min. | 30 min. |
| 0 | 0 | 0 | 0 | 0 | 0 | 0 | 0 |
| 0 | 1.0 | 0 | 1 | 1 | 0 | 0 | 0 |
| 0 | 2.0 | 1 | 1 | 1 | 0 | 0 | 0 |
| 0 | 5.0 | 1 | 2 | 2 | 1 | 1 | 1 |
| 0 | 10.0 | 2 | 2 | 2 | 2 | 2 | 2 |
| 0 | 20.0 | 2 | 2 | 2 | 1 | 1 | 1 |
| 0 | 0 | 0 | 1 | 1 | 0 | 0 | 0 |
| 40 | 0 | 1 | 2 | 2 | 1 | 2 | 2 |
| 40 | 1.0 | 3 | 3 | 3 | 1 | 1 | 1 |
| 40 | 2.0 | 2 | 3 | 3 | 2 | 3 | 3 |
| 40 | 10.0 | 3 | 3 | 3 | 2 | 3 | 3 |
| 40 | 20.0 | 3 | 3 | 3 | 2 | 3 | 3 |

[1] Pounds per air-dried ton of clay-fiber.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. In a process for the production of paper wherein an aqueous fluid containing cellulosic pulp and other papermaking ingredients is formed into a sheet on a fourdrinier wire cloth, the improvement which comprises adding to said aqueous fluid before the furnish contacts said fourdrinier wire cloth a cationic starch complex prepared by reacting an aqueous starch slurry with a water-soluble cationic polymeric polyelectrolyte in a ratio of from 0.02 to 0.25 parts by weight of the polyelectrolyte per part of starch, said polyelectrolyte formed by reacting in approximately equimolecular quantities a dihalo organic compound having the formula $$X-(Y)_m-Z-(Y)_n-X$$

wherein X represents Br or Cl; Y represents a $CH_2$ group or a $CH_2$ group wherein one of the hydrogens thereof is replaced by alkyl or hydroxymethyl, characterized in that the total number of substituted $CH_2$ groups of each Y may not exceed 3, $m$ and $n$ independently represent integers varying from 1 to 10,

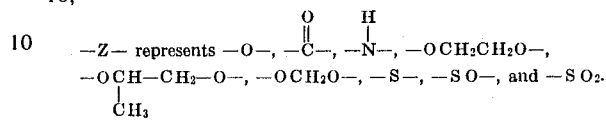

with a secondary or a ditertiary amine in the presence of a solvent, in an amount sufficient to improve the papermaking process and the paper and paperboard produced thereby.

2. The process of claim 1 wherein the dihalo organic compound is 1,2-bis(2-chloroethoxy)ethane.

3. The process of claim 1 wherein the dihalo organic compound is dichloroethyl ether.

4. The process of claim 1 wherein the dihalo organic compound is 1,4-bis(chloromethyl)benzene.

5. The process of claim 1 wherein the cationic starch complex used in said process is formed by reacting an aqueous starch slurry with a water-soluble cationic polymeric polyelectrolyte in a ratio of from 0.02 to 0.25 parts by weight of the polyelectrolyte per part of starch, said polyelectrolyte formed by reacting in approximately equimolecular quantities a dihalo organic compound having the formula:

$X-(Y)_m-Z-(Y)_n-X$ wherein X represents Br or Cl; Y represents a $CH_2$ group or a $CH_2$ group wherein one of the hydrogens thereof is replaced by alkyl or hydroxymethyl, characterized in that the total number of substituted $CH_2$ groups of each Y may not exceed 3; $m$ and $N$ independently represent integers varying from 1 to 10, n $-Z-$ represents $-O-$, $-\overset{O}{\underset{\|}{C}}-$, $-\overset{H}{\underset{|}{N}}-$, $-OCH_2CH_2O-$, $-O\underset{\underset{CH_3}{|}}{CH}-CH_2-O-$, $-OCH_2O-$, $-S-$, $-SO-$, and with N, N, N', N'-tetramethylethylenediamine.

6. The process of claim 5 wherein the polyelectrolyte is formed by reacting a dihalo organic compound with N,N'-dimethylpiperazine.

7. The process of claim 5 wherein the polyelectrolyte is formed by reacting a dihalo organic compound with N,N,N',N'-tetramethyl-1,3-butanediamine.

8. The process of claim 5 wherein the polyelectrolyte is formed by reacting a diahlo organic compound with dimethylamine.

9. The process of claim 5 wherein the starch used in preparing the cationic starch complex is corn starch.

10. The process of claim 5 wherein the starch used in preparing the cationic starch complex is tapioca starch.

11. The process of claim 5 wherein the starch used in preparing the cationic starch complex is wheat starch.

12. The process of claim 5 wherein the starch used in preparing the cationic starch complex is potato starch.

* * * * *